United States Patent
Don-Yehiya

Patent Number: 6,004,147
Date of Patent: Dec. 21, 1999

[54] LINE TERMINAL PARTICULARLY SIGNAL TRANSMITTER, CONNECTOR ASSEMBLY

[75] Inventor: Yehuda Don-Yehiya, Kiryat Yam, Israel

[73] Assignee: State of Israel, Ministry of Defence, etc., Haifa, Israel

[21] Appl. No.: 08/753,536

[22] Filed: Nov. 26, 1996

Related U.S. Application Data

[63] Continuation of application No. 08/298,601, Aug. 31, 1994, abandoned.

[30] Foreign Application Priority Data

Sep. 2, 1993 [IL] Israel ......................................... 106876

[51] Int. Cl.[6] ..................................................... H01R 13/44
[52] U.S. Cl. ............................................ 439/138; 439/142
[58] Field of Search ..................................... 439/135–138, 439/142, 146, 149

[56] References Cited

U.S. PATENT DOCUMENTS

| | | |
|---|---|---|
| 3,279,497 | 10/1966 | Norton et al. . |
| 4,217,019 | 8/1980 | Cameron ................................. 439/138 |
| 4,411,491 | 10/1983 | Larkin et al. ......................... 350/96.21 |
| 4,431,241 | 2/1984 | Hazelhurst .............................. 439/138 |
| 4,640,575 | 2/1987 | Damas ................................... 350/46.2 |
| 4,696,540 | 9/1987 | Adams et al. ......................... 350/96.21 |

FOREIGN PATENT DOCUMENTS

| | | |
|---|---|---|
| 0 232 792 | 8/1987 | European Pat. Off. . |
| 0232792 | 8/1987 | European Pat. Off. ................ 439/138 |
| 0 485 196 | 5/1992 | European Pat. Off. . |
| 0 538 089 | 4/1993 | European Pat. Off. . |
| 0 570 652 | 11/1993 | European Pat. Off. . |
| 2059081 | 6/1971 | Germany ............................... 439/138 |
| 2229543 | 8/1973 | Germany ............................... 439/138 |
| 27 34 522 | 2/1979 | Germany . |
| 33 07 289 | 9/1984 | Germany . |
| 35 30 639 | 3/1987 | Germany . |

*Primary Examiner*—Hien Vu
*Attorney, Agent, or Firm*—Eugene Lieberstein; Michael N. Meller

[57] ABSTRACT

The conductor assembly for optical or electrical conductor or fluid line terminals, according to the invention, comprises a socket and a plug, each having a cavity for receiving conductor terminals. Socket and plug are mutually displaceable to engage them, whereby to engage the respective conductors and allow signals to be transmitted between them or to engage the respective fluid line terminals to allow fluid to flow through them, or to disengage them, whereby to disengage said conductors or said fluid line terminals. Each of them is provided with a cover for screening the respective conductor terminals from the environment, when closed, and baring them when open, and with elastic means urging the cover to its closed position. Opening means are provided for bringing said covers to their open positions when socket and plug are engaged, said elastic means bringing said covers back to their closed position when said socket and plug are disengaged.

14 Claims, 7 Drawing Sheets

LINE TERMINAL PARTICULARLY SIGNAL TRANSMITTER, CONNECTOR ASSEMBLY

This application is a continuation, of application Ser. No. 08/298,601, filed Aug. 31, 1994 abandoned.

FIELD OF THE INVENTION

This invention relates to line terminal connector assemblies, more particularly signal transmitter connector assemblies, specifically to an assembly for permitting the transmission of optical or electrical signals between the terminals of two transmission lines or between a generator and a transmission line, or between a transmission line and a receiver. Such signal transmitter connector assemblies of the invention may further be provided with additional connections, such as for feeding a gas therethrough. Further, the connector assemblies of this invention may serve to connect fluid, e.g. gas, lines, in the absence of optical or electrical terminals.

BACKGROUND OF THE INVENTION

Connector assemblies for electrical or optical conductors are conventional in the art. In the case of optical fibers the problem arises of protecting them against contamination from dirt, dust and the like, which may cause an alteration in the transmission of optical signals. Another problem which arises is how to protect the eye of the user against accidental damage from radiation, e.g. laser radiation, issuing from the terminals of conductors and emitters. Electrical conductors are less sensitive to contamination, but they should desirably be protected against it, especially in applications in which a perfect electrical contact is important.

U.S. Pat. No. 4,640,575 discloses a combination dust cover and radiation shield which normally covers and can be forced into close engagement with a terminal from which radiation, e.g. laser radiation, is emitted, and can be detached therefrom and deformed to allow insertion of another terminal. Such a device, however, requires manual operation, is unreliable because it is based on the elastic memory of the flap, and is structurally awkward and adapted to be applied only to a socket type terminal. It is therefore of very limited applicability and efficiency.

DE 3307289 discloses a connection for optical fibers in which both terminals are closed by a transparent plate, both plates being elastically mounted to facilitate their coming into contact. This device actually provides no protection against dirt, because such dirt will accumulate on the transparent plates and interfere with the transmission of optical signals. Their presence, further, may interfere with a good optical engagement of the terminals.

OLS 2734522 discloses a connection for optical fibers in which one terminal is protected by a flexible membrane, which is cut along radial lines, so that the terminal itself may penetrate through the membrane, deflecting it outwardly, and engage the other terminal. This device affords protection to one terminal only and further is based on a flexible membrane and is therefore not reliable. Furthermore, when the two terminals are coupled, the flexible membrane is deflected towards the inside of the coupling and tends to introduce into it any dirt that may have accumulated thereon.

U.S. Pat. No. 4,411,491 describes a connector assembly wherein the two terminals are protected by flexible membranes that are centrally slit, displacement means being provided for deforming the membranes, upon engagement of the connector components, so as to widen the slit and permit passage and mutual engagement of the optical elements. This device is structurally complicated and does not provide full protection of the optical terminals. Since it is based on the deformation of flexible membranes, it is not reliable and its performance on reusing is doubtful, as it is based on the assumption that the membranes will fully recover from the deformed state in which they have been kept during the operation of the coupling. Further, it too tends to introduce into the coupling any dirt that may have accumulated on the membranes.

U.S. Pat. No. 4,696,540 discloses a connector assembly in which both terminals are protected by a diaphragm, and both diaphragms are perforated by ferrules mounted on the ends of the optical fibers of one terminal, which can thus come into optical engagement with the fibers of the other terminal. This device is intended for underwater use and, if applied to other uses, it is needlessly complicated. It is unreliable, because it entrusts the optical fiber ends, provided with ferrules, with a perforating action. It is not reversible, because once the diaphragms have been perforated, the device must be disassembled and reassembled if it is to be used again. Furthermore, the ferrules, in performing their perforating action, will pick up dirt that has accumulated on the diaphragms and carry it into the coupling.

None of the devices disclosed in the prior art has the qualities of being fully automatic, fully reversible, sturdy and completely reliable, and of a simple and economical construction.

It is an object of this invention to provide such a device.

It is another object of this invention to provide such a device which does not rely on flexible membranes or the like elements.

It is a further object to provide such a device which will prevent any dirt that may have accumulated thereon from coming into contact with the conductor terminals.

It is a still further object to provide such a device which will completely protect the terminals both in their disengaged and in their engaged relationship.

It is a still further object to provide such a device that can be engaged and disengaged with a simple and quick motion.

It is a still further object to provide such a device that is provided with means for assuring that an exact positioned relationship of the terminals, and therefore a perfect optical or electrical contact, is automatically achieved.

It is a still further object to provide a connector device for fluid lines terminals which completely protects the terminals in their engaged and disengaged positions.

Other objects and advantages of the invention will become apparent as the description proceeds.

SUMMARY OF THE INVENTION

The connector assembly for optical or electrical conductor or fluid line terminal, according to the invention, is characterized in that it comprises:

a—a first component, hereinafter called "socket member" or "socket", having a cavity defined therein for receiving first terminals;

b—a second component, hereinafter called "plug member" or "plug", having a cavity defined therein for receiving second terminals;

c—said socket and said plug being mutually displaceable mutually to engage them, whereby to bring said first and second terminals into an engaged or connected positioned relationship, or mutually to disengage them, whereby to bring said first and second terminals into a disengaged or disconnected, spaced positioned relationship;

d—first cover means, hereinafter called "first lid" in said socket, said first lid having a closed and an open position and screening, when in said closed position, said first terminals from the environment and baring said first terminals when in said open position;

e—second cover means, hereinafter called "second lid", in said plug, said lid having a closed and an open position and screening, when in said closed position, said second terminals from the environment and baring said second terminals when in said open position;

f—elastic means for urging said first and second lids to their respective closed positions when said socket and said plug are not in their engaged positioned relationship;

g—first opening means in fixed positioned relationship with respect to said socket for bringing said second lid to its open position when said socket and said plug are mutually displaced to bring them to their engaged positioned relationship; and h—second opening means in fixed positioned relationship with respect to said plug for bringing said first lid to its open position when said plug and said socket are mutually displaced to bring them to their engaged positioned relationship;

i—said elastic means returning said first and second lids to their closed positions when said socket and plug are mutually displaced mutually to bring them to their disengaged positioned relationship.

In a preferred form of the invention, the terminals are or comprise optical or electrical terminals and their engaged positioned relationship is such that signals may be transmitted therebetween.

Preferably, said connector assembly comprises guide means in said socket and said plug for guiding them in said mutual displacements. Also preferably, said first opening means are so positioned in said socket that said second lid is brought to its open position before said second opening means become operative.

Also preferably, said lids are pivoted to the respective connector members and are swingable from their closed to their open positions, and vice versa; and the elastic means are tension springs attached to the lids so as to exert thereon a moment of rotation in such a direction as to maintain them in their closed position or bring them back to it when they have been opened.

The opening means comprise preferably a first surface on a base rigidly connected to the socket and a second surface on the second lid, which surfaces come into engagement when said plug and socket are mutually displaced to engage them, and are so positioned that said first surface exerts a pressure on said second surface, when they come into engagement, which produces a moment on said second lid having the opposite direction to the moment exerted thereon by the respective tension spring. The second opening means preferably comprise a third surface on a handle rigidly connected to the plug and a fourth surface on the first lid, which surfaces come into engagement when said plug and socket are mutually displaced to engage them, and are so positioned that said third surface exerts a pressure on said fourth surface, when they come into engagement, which produces a moment on said first lid having the opposite direction to the moment exerted thereon by the respective tension spring.

The plug and socket members preferably have seats defined therein for receiving each the lid carried by the other member when the same is in its open positions.

The plug and socket members have cavities or chambers defined therein for housing the terminals, the plug member preferably having a sleeve-like end portion or projection which fits into the socket chamber when the two members are engaged in their operative positioned relationship.

DETAILED DESCRIPTION OF PREFERRED EMBODIMENTS

Figure 1:
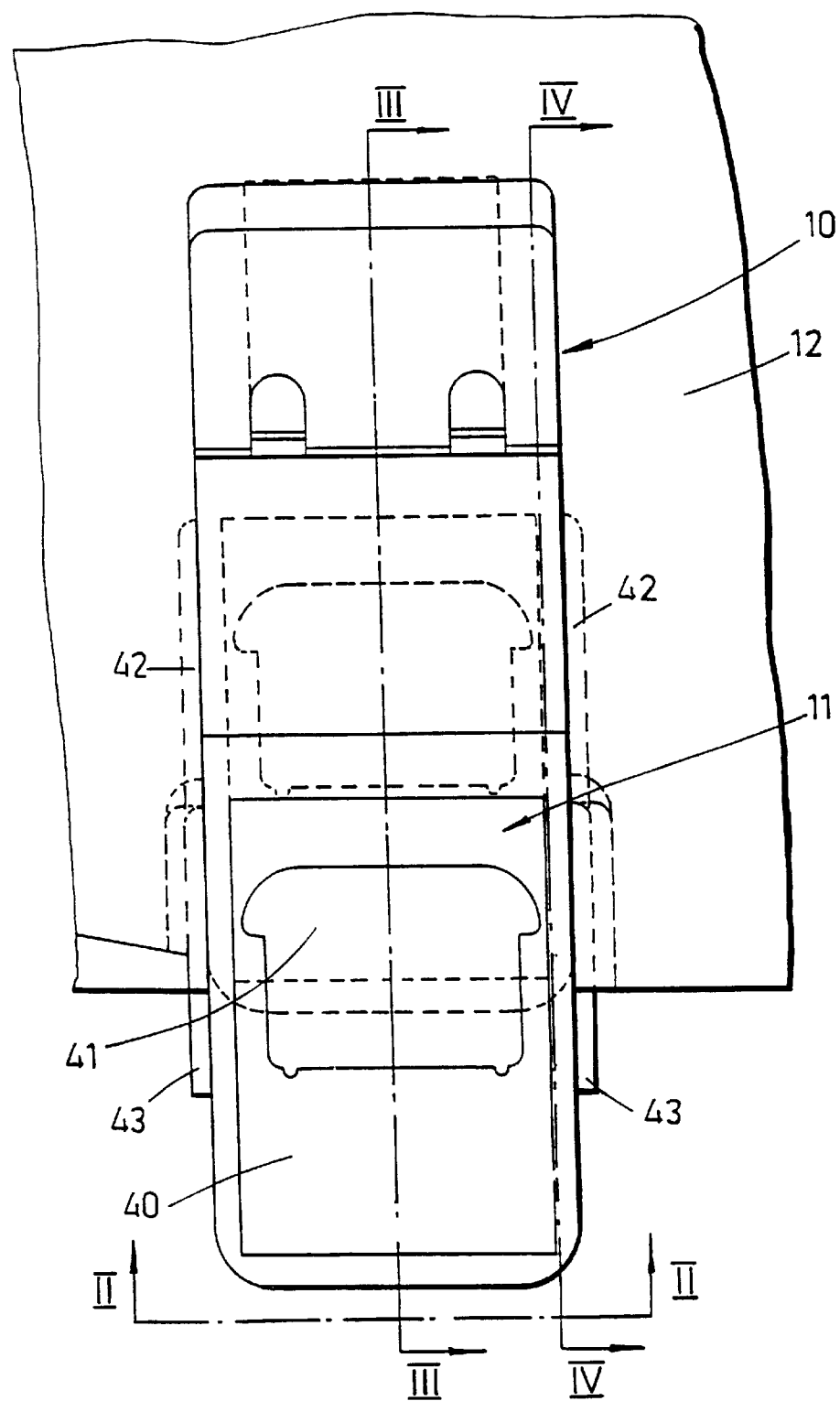
FIG. 1 is a plane view from the top of a connector device according to an embodiment of the invention.
Figure 2:
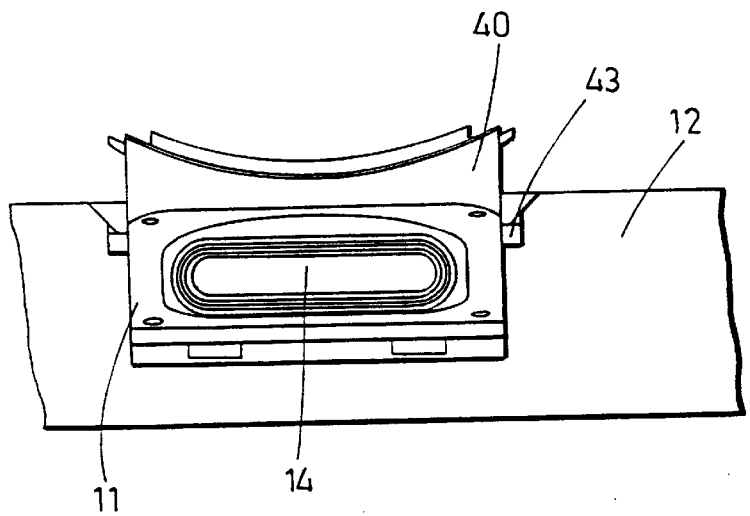
FIG. 2 is a vertical end view of the device of FIG. 1, seen from the plane II of FIG. 1.
Figure 10:
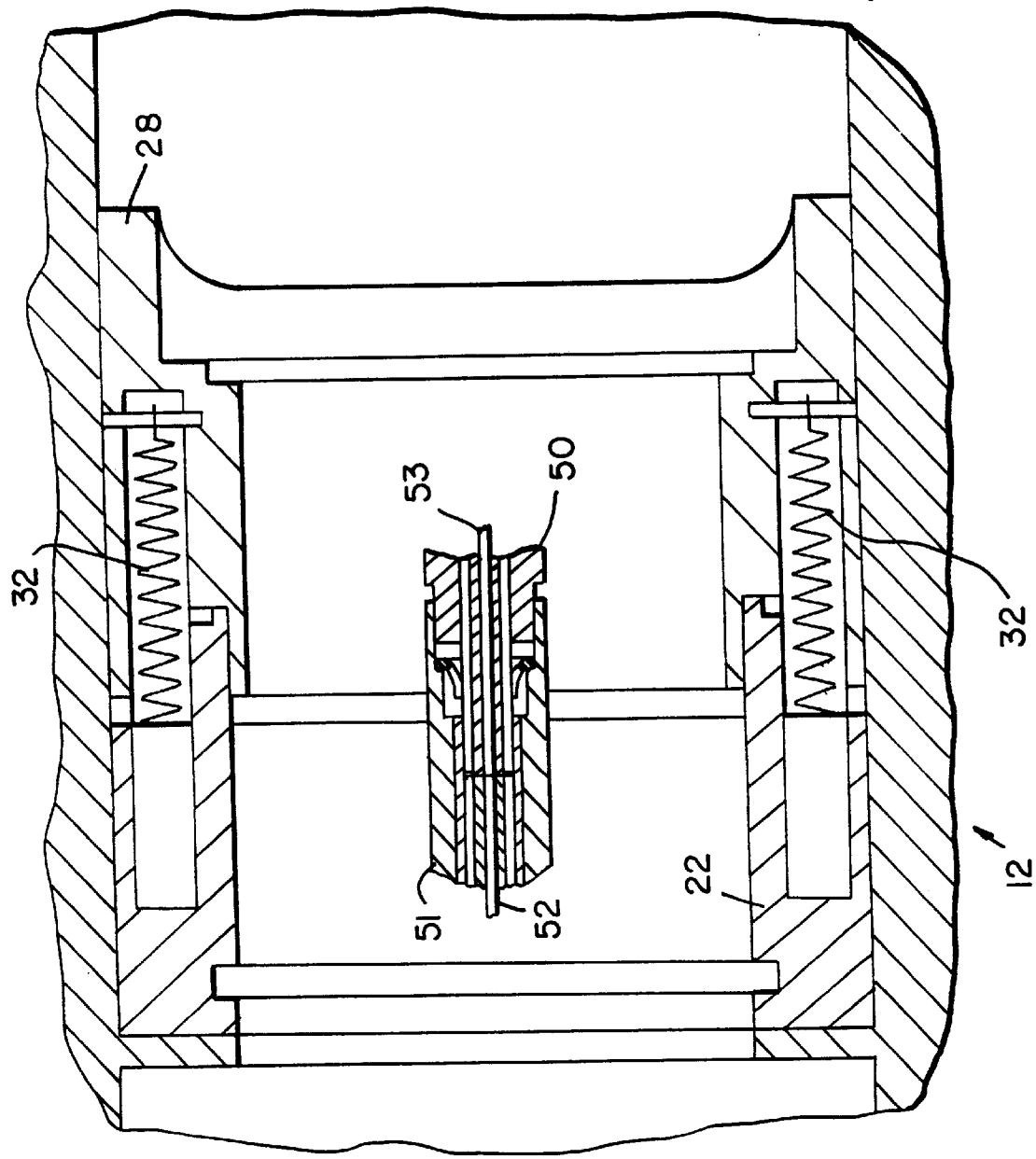
FIG. 10 illustrates, in cross-section similar to FIG. 9, a connector having optical fiber terminals therein.

With reference now to the drawings, in the embodiment therein illustrated, one of the two elements of the connector, viz. the socket member, is attached to a base, which in this embodiment is a support body 12, shown in the drawings as broken off and which may be of any kind or shape, as long as it is suited to support the socket and to provide the guide and opening elements that will be described hereinafter. In the absence of a support body, the said guide and opening elements would have to be provided in parts attached rigidly or in fixed positioned relationship to the socket. The term "base", as used herein and in the claims, is intended therefore to include both a support body or any parts rigidly connected or connectable in fixed positioned relationship to the socket. The second element of the connector, generally indicated at 11, viz. the plug member, is shown in FIG. 1 in two different positions: in the disengaged or disconnected position in full lines and in the engaged or connected position in broken lines. The socket 10 comprises a cavity or chamber 13, in which the terminals of the optical fibers or electrical wires or in general any conducting elements that are to be connected by means of the connector, are housed. Correspondingly, the other terminals, also not shown, are housed in a cavity or chamber 14 provided in the plug 11. The said terminals are not shown in the drawings because they are not part of the invention and may be conventional. However, for purposes of illustration, optical terminals are schematically shown in FIG. 10. Chambers 13 and 14 are therefore terminal housing chambers. As most clearly seen in FIG. 5, plug 11 has a projection or end or forward portion 15 which is sleeve-shaped, and of such an outer diameter that it fits snugly within chamber 13 of the socket when the connector is in the engaged or operative position. In that position, the terminals carried by the plug and socket respectively have come into optical or electrical engagement, as the case may be.

Figure 5:
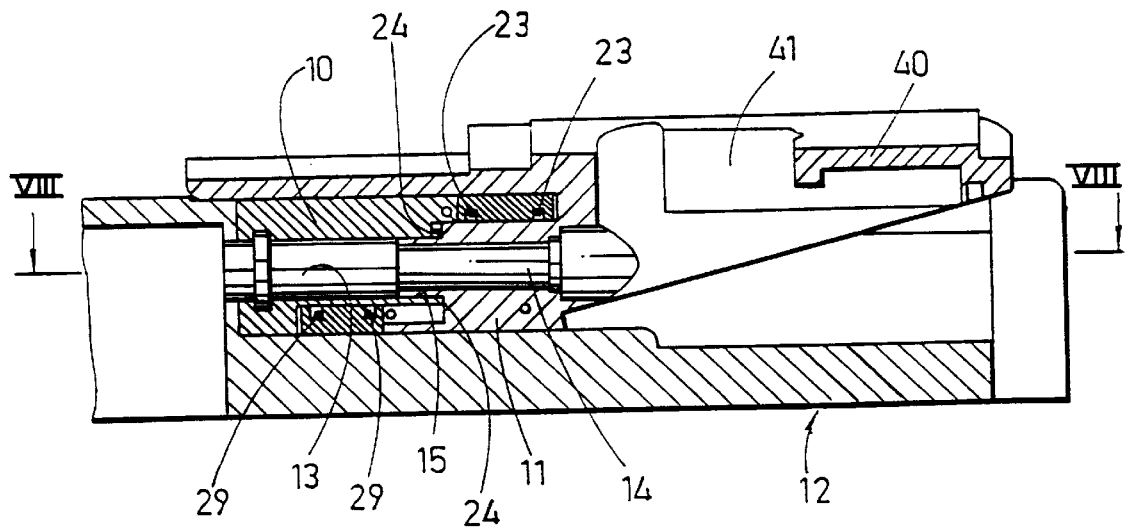
FIGS. 5 and 6 are vertical, longitudinal cross-sections of the connector of FIG. 1, taken on the planes III—III and IV—IV of FIG. 1, respectively, showing the connector in its operative position.

The socket 10 is provided with a closure member or lid 20 which is a plate, preferably a metal plate, pivoted at 21 to body 22 of socket 10 and provided with grooves which preferably house gaskets 23 (best seen in FIG. 5). Said grooves are adapted to receive lips 24 of socket body 22. Similarly, plug 11 is provided with a closure member or lid 26, pivoted at 27 to body 28 of the plug and provided with grooves preferably housing gaskets 29 (best seen in FIG. 5) adapted to engage lips 30 of plug body 28. By the cooperation of socket and plug body lips with gaskets 23 and 29, chambers 13 and 14 housing the terminals are tightly protected against contamination when the plug and socket are disengaged.

Figure 4:
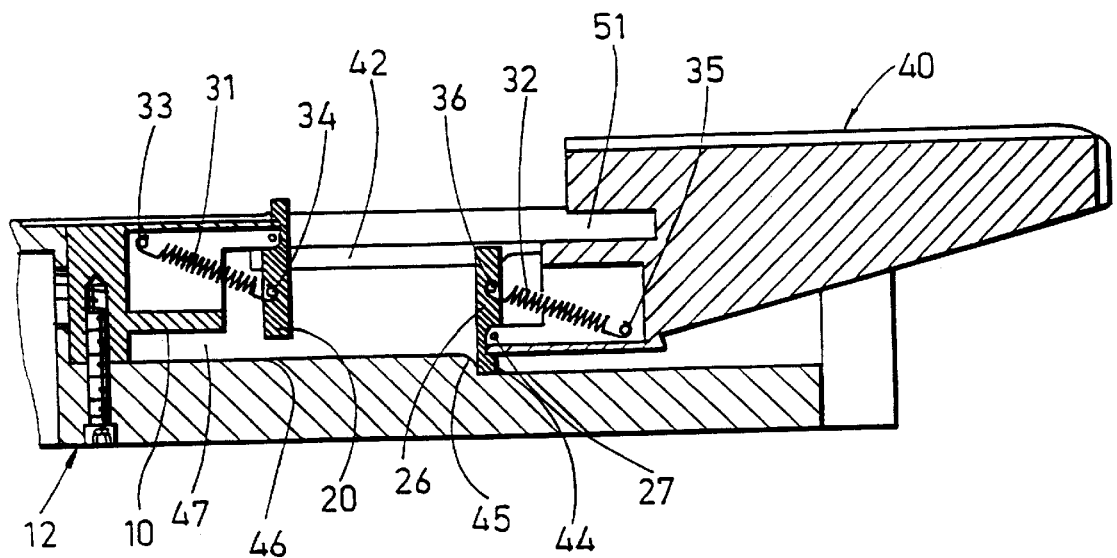

Socket 10 is provided with spring 31 and plug 11 is provided with spring 32. When the connector is in the disconnected or disengaged position, as seen in FIG. 4, spring 31, which is attached at 33 to body 22 of socket 10 and at 34 to lid 20, keeps this latter in an essentially vertical position, in contact with lips 24 of socket body 22, thereby to close the space within the seat 13 and fully protect the optical or electrical terminals housed therein from any contamination. Similarly, spring 32, which is attached at 35 to body 28 of plug 11 and at 36 to lid 26 of plug 11, keeps said lid 26 in an essentially vertical position, in engagement with lips 30 of plug 11, whereby to close chamber 14 and fully protect any optical or electrical terminals housed therein from any contamination.

Figure 6:
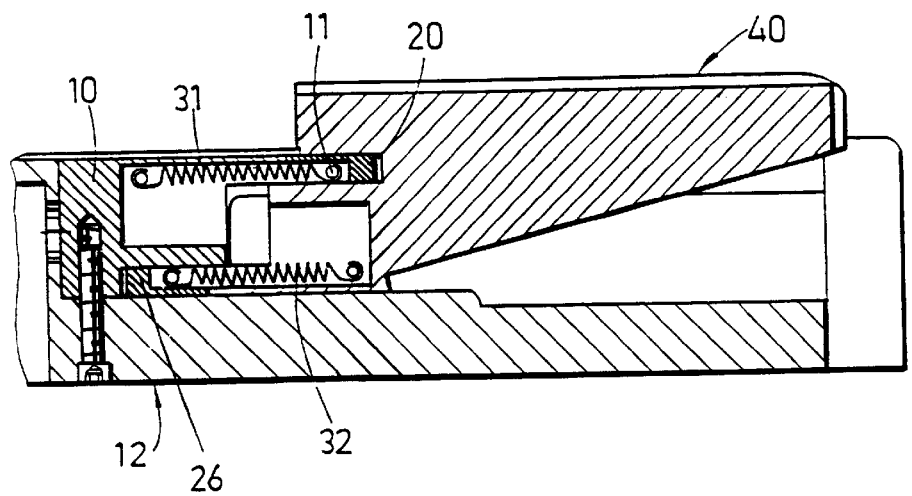
Figure 7:
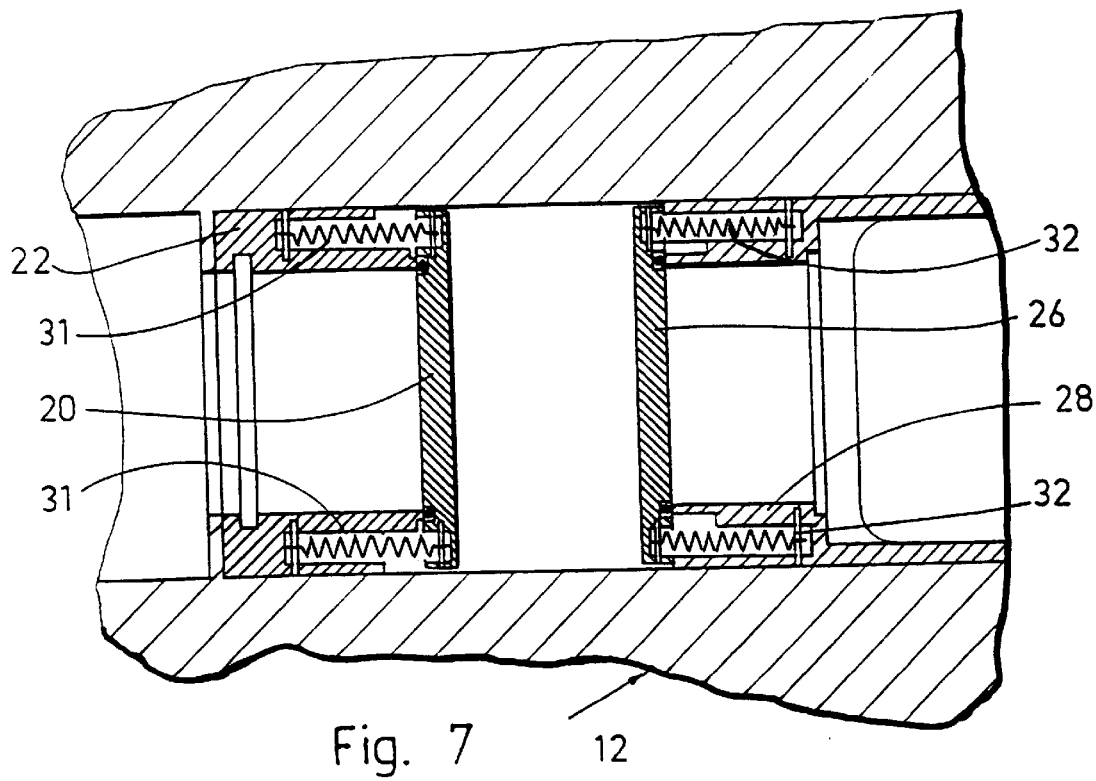
FIG. 7 is a horizontal cross-section of said connector in the inoperative position, taken on the plane VII—VII of FIG. 3 looking in the direction of the arrows.

Plug 11 is provided with or rigidly connected to means for displacing it, which means will be generally called "handle", it being understood that this term is to be construed as signifying any element that is connected to the plug proper in fixed positioned relationship and is, in substance, an extension of the plug itself. In this embodiment, a handle 40 is provided, which may be shaped in any convenient way, as long as it permits to introduce the terminals into chamber 14 and to maneuver said plug to the connected or to the disconnected position, as the case may be. For this purpose, handle 40 is desirably provided with an opening 41, into which the operator may insert his fingers to pull the plug out of engagement with the socket. Support body 12 is provided with lateral grooves 42 adapted to be engaged by ribs 43 of the plug: see FIG. 1, wherein grooves 42 are shown in broken lines. The plug is thus guided in a sliding motion from the disengaged to the engaged position. As it so slides, the bottom lip 44 of lid 26 engages a shoulder 45 on support body 12 (see FIG. 4). As the plug is pushed further towards the closed position (to the left in the drawings), the engagement of lip 44 and shoulder 45 generates a moment about pivot 27 that is opposed to the moment of spring 32, and, as the plug continues to slide towards the engaged position, lid 26 rotates counterclockwise, as seen in the drawings, until it lies against a bottom horizontal surface 46 of support body 12. As the plug continues its motion, lid 26 slides into a seat 47 between surface 46 and the lower surface of socket 10 and assumes the position shown in FIGS. 5 and 6. Also, a projection 48 of plug 11 engages the upper lip 49 of closure member 20 of the socket (see FIG. 3), generates a moment of rotation about pivot 21 that is opposite to the moment of spring 51, and causes lid 20 to rotate in a counterclockwise direction, as seen in the drawing, until it reaches a horizontal position against the lower surface 50 of projection 48. Finally, closure member 20 enters a seat 51 defined in the plug handle 40 (as clearly seen in FIG. 6). The engaged position illustrated in FIGS. 4 and 6 is reached, wherein the sleeve-like projection or end portion 15 of plug 11 snugly fits into chamber 13 of socket 10 and the terminals housed in said chamber 13 and chamber 14 of the plug come into the desired optical or electrical engagement.

Figure 3:
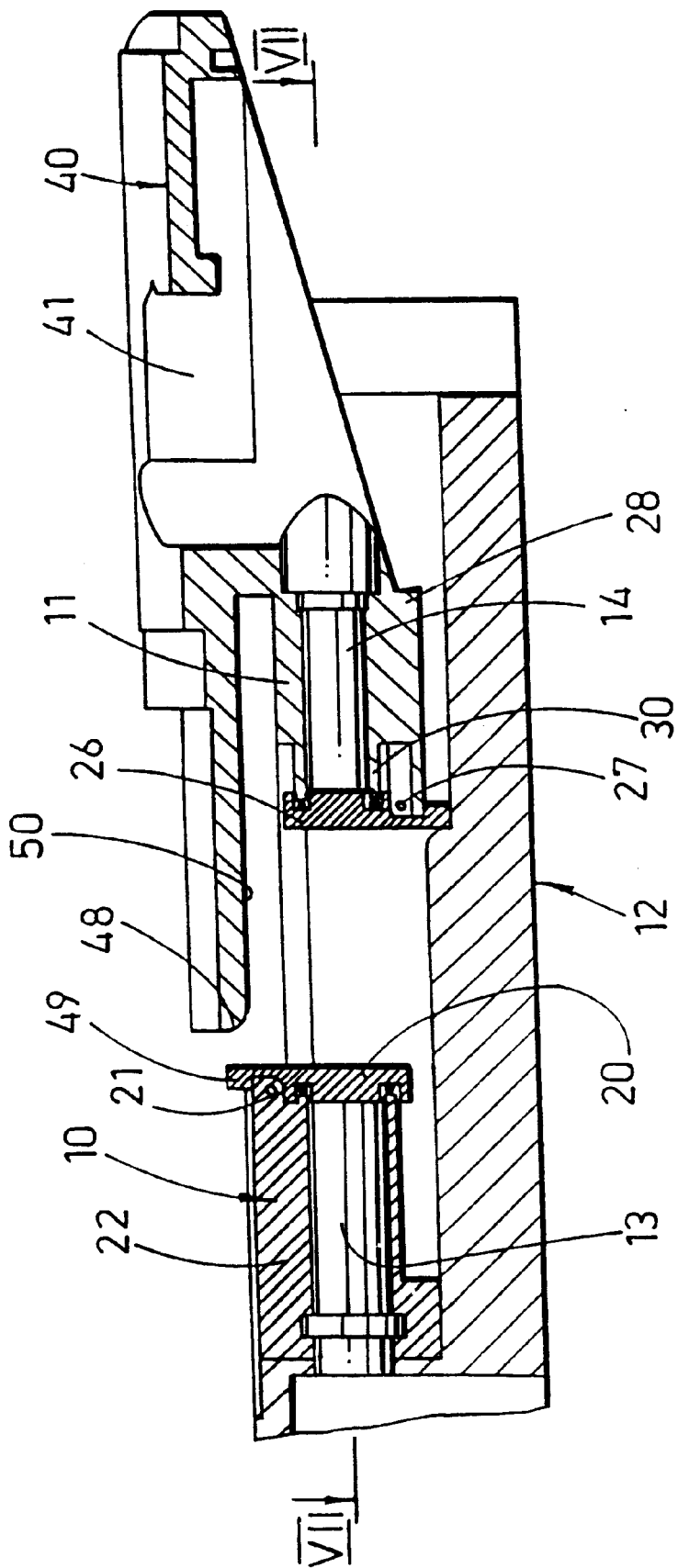
FIGS. 3 and 4 are vertical, longitudinal cross-sections of the connector of FIG. 1, taken on the planes III—III and IV—IV respectively, looking in the direction of the arrow, showing the connector in the inoperative condition.

It may be desirable to avoid having to exert sufficient force on handle 40 concurrently to stretch both springs 31 and 32. To that end—as shown in FIG. 3—projection 48 is preferably not as long as to come into contact with upper lip 49 when bottom lip 44 comes into contact with shoulder 45, so that one of the two lids is engaged and rotated before the other and is brought to its open position or close to it before the rotation of the other lid begins.

It is seen that, firstly, the lids or cover members 20 and 26 perfectly close terminal chambers 13 and 14 and fully protect the terminals housed therein from any contamination. Secondly, during the motion of the plug to the connected position, both lids or cover members are rotated away from their respective terminal housing chambers, and when they reach said connected position, they are located outside the space defined by the terminal housing chambers, from which they are separated by metal surfaces. In this way no dirt that may have accumulated on the lids is transferred to the space in which the terminals are finally housed, when they come into contact. The device is therefore of a sturdy, simple operation, and guarantees full protection of the terminals from any contamination—a result that no device of the prior art could achieve.

When the plug handle is pulled away from the socket, preferably by the operator's inserting his fingers into the opening 41 and pulling, the motions of the lids or closure members 20 and 26 hereinbefore described are reversed. As soon as lid 20 becomes disengaged from cavity 51 and lid 26 becomes disengaged from cavity 47, they begin to rotate clockwise (as seen in the drawings), under the action of the respective springs. As soon as lip 49 of lid 20 is disengaged from projection 48 of plug handle 40 and lip 44 of lid 26 is disengaged from shoulder 45 of the support body 12, there is no moment opposing that of springs 31 and 32, and both lids assume their closed position. The device, therefore, is fully reversible.

Figure 8:
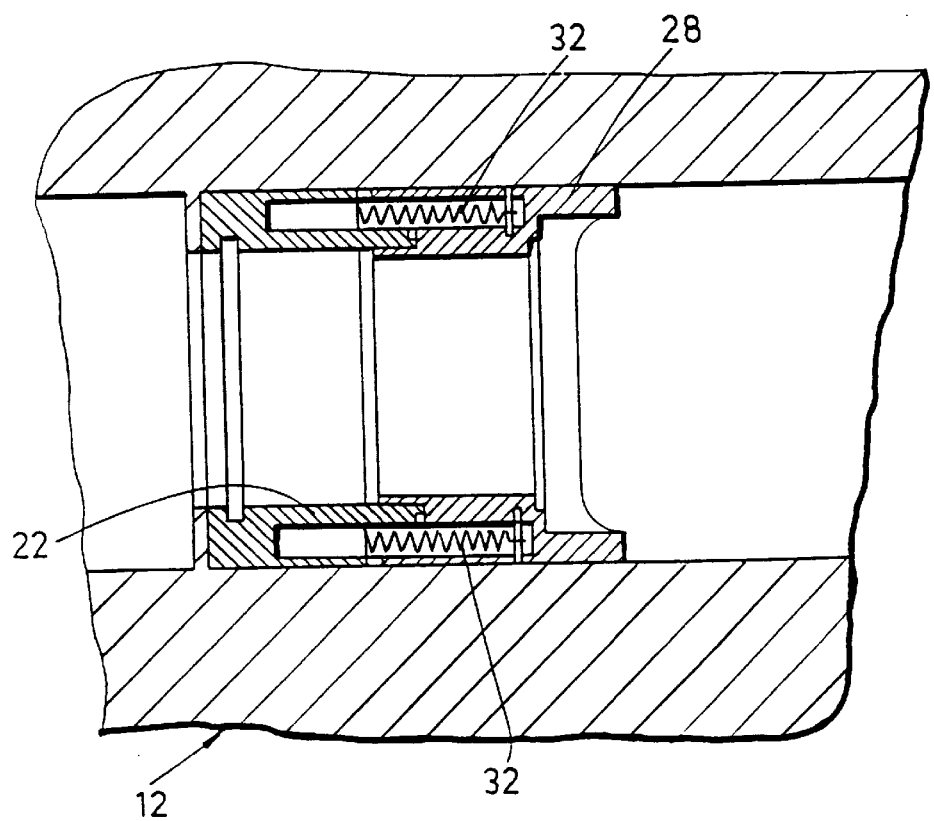
FIG. 8 is a horizontal cross-section of said connector in the operative position, taken on the plane VIII—VIII of FIG. 5 looking in the direction of the arrows.
Figure 9:
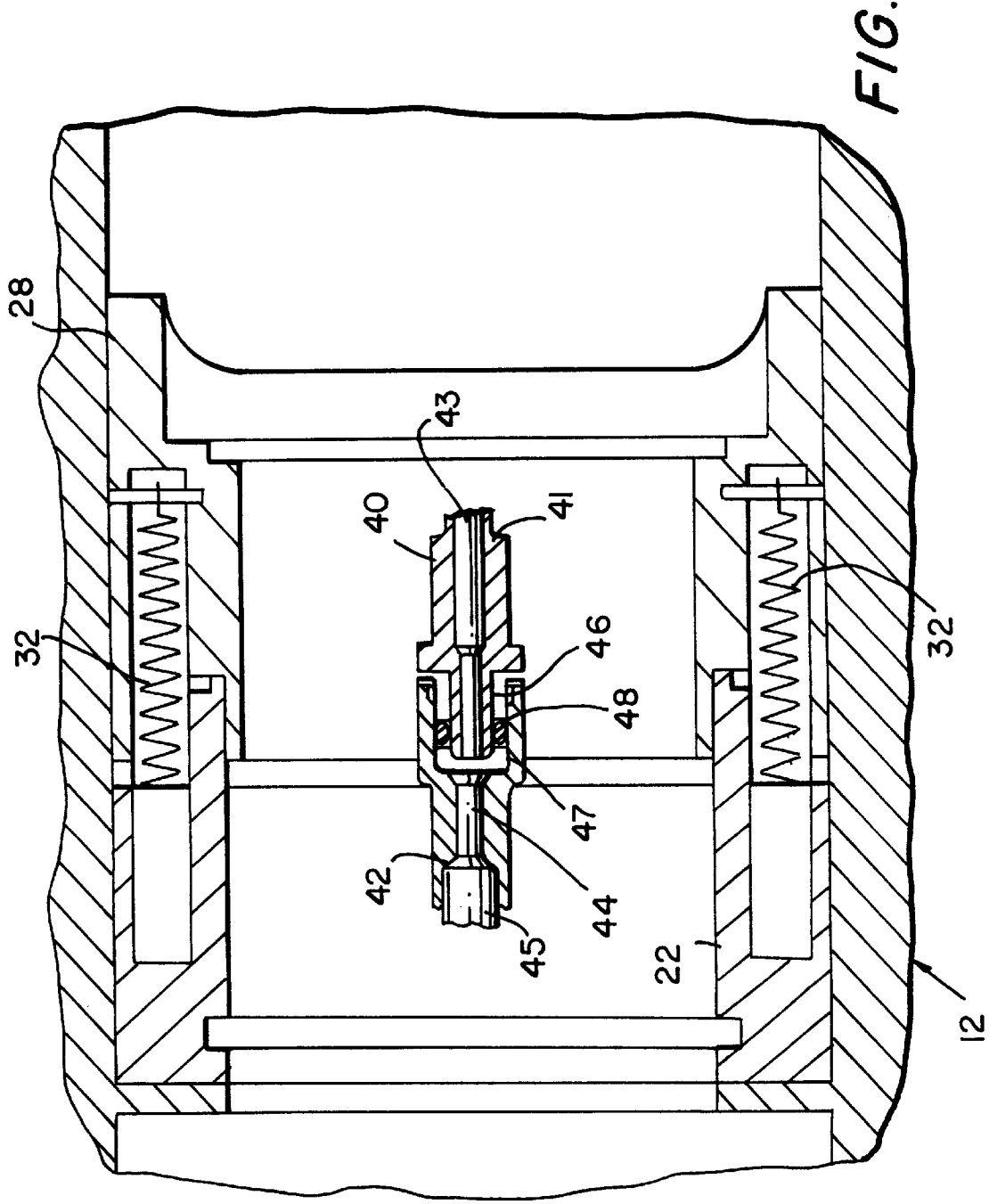
FIG. 9 illustrates, in cross-section similar to FIG. 8, a variant of the invention, wherein means are provided for feeding a fluid through the connector.

FIG. 9 illustrates another embodiment of the invention in which means are provided for feeding fluid, e.g. gas, through the connector for any purposes, such as for providing an inert gas atmosphere, or the like. FIG. 9 is a cross-section similar to FIG. 8, wherein the corresponding parts are indicated by the same numerals. In addition to the parts shown in FIG. 8, this embodiment of the invention also comprises a gas connector generally indicated at 40, which comprises a male member 41 and a female member 42. Male member 41 is attached, in any convenient way, to plug 11, and female member 42 is attached, in any convenient way, to socket member 12. The reverse could also be true, and the female member could be attached to the plug and the male member to the socket. Male member 41 comprises a tubular passage 43 for connection to a fluid line, not shown, and female member 42 has a tubular passage 44 for connection, through a socket 45, to a fluid line. Male member 41 has a nozzle portion 46 which is received, when the corrector is engaged as shown in FIG. 9, into a cup-like receiving portion 47 of female member 42. A gas seal is provided by a gasket 48 between the outer surface of nozzle portion 46 of the male member and the inner surface of cup-shaped portion 47 of the female member. A continued, sealed passage is thus determined between the tubular passages 43 and 44.

FIG. 9 also illustrates another embodiment of the invention, in which the connector assembly is used to provide passage of a gas or other fluid, without optical or electrical terminals being present.

FIG. 10 schematically illustrates a structure such as that of FIG. 9, in which optical fiber terminals 50 and 51, with optical fiber ends 52 and 53, are shown in mutually engaged position. Different optical terminals or electrical terminals could be provided, and more than one type of terminals could be housed by the same connector, by suitably positioning them therein.

While embodiments of the invention has been described by way of illustration, it will be clear that it can be carried out with numerous variations, modifications and adaptations, without departing from its spirit or exceeding the scope of the claims.

I claim:

1. A connector assembly for engaging and disengaging a plurality of terminals containing optical or electrical conductors or fluid line terminals respectively with said connector assembly having an engaged position in which said plurality of terminals are moved relative to one another to interconnect the respective conductors in each of said plurality of terminals and a disengaged position in which said plurality of terminals are moved into a position in which the conductors are disconnected, said connector assembly comprising:
   a—a support body and a handle;
   b—a socket supported in said support body, said socket having a socket cavity and a plurality of first terminals, a first cover movably connected to the socket cavity to provide a closed and an open position respectively for said socket cavity such that when in said closed position said socket cavity is closed thereby providing a screen for isolating said plurality of first terminals from environmental pollutants;
   c—a plug rigidly connected to said handle, said plug having a plug cavity and a plurality of second terminals, a second cover movably connected to said plug cavity to provide a closed and an open position respectively for said plug cavity such that when in said closed position said plug cavity is closed thereby providing a screen for isolating said second plurality of terminals from environmental pollutants;
   d—said plug and socket cavity being sized and shaped such that said plug is movably inserted and withdrawn from said socket cavity in response to the relative movement of said support body and handle to bring said plug and socket to an engaged position in which said first and second terminals are in operative contact and a disengaged position in which such first and second terminals are disconnected;
   e—said support body and handle being mutually displaceable to engage said plug in said socket and to disengage said plug from said socket;
   f—elastic means connected to each of said first and second cover for urging the first and second cover to their respective closed positions when said plug and socket disengage;
   g—shoulder means fixed to said support body for bringing said second cover to the open position thereof when said socket and plug are moved into engagement;
   h—projecting means fixed to said plug for bringing said first cover to the open position thereof when said socket and plug are moved into engagement; and
   i—said elastic means returning said first and second cover to their closed position, when said plug is withdrawn from said socket cavity.

2. Connector assembly according to claim 1, wherein the first and second cover are pivoted to the plug and socket member respectively and are swingable from the closed to the open position thereof, and vice versa.

3. Connector assembly according to claim 2, wherein the elastic means comprises first and second tension springs attached to said first and second cover respectively so as to exert thereon a moment of rotation.

4. Connector assembly according to claim 3, wherein the first and second cover comprise swingable plates respectively having an axis and the tension springs are so connected to said covers and to the plug and socket members, respectively, that the axes of the swingable plates lie approximately in a central plane of each of said plates when said covers are in the open positions.

5. Connector assembly according to claim 2, wherein the first and second cover are pivoted to the plug and support body respectively so as to swing in opposite directions when they both swing from the closed to the open position thereof, and vice versa.

6. Connector assembly according to claim 1, wherein the plug member has a terminal portion to fit in the cavity defined in the socket member when the plug and socket members are mutually engaged.

7. Connector assembly according to claim 1, wherein the plurality of first terminals and the plurality of second terminals are optical terminals which transmits signals when the terminals are engaged to one another.

8. Connector assembly according to claim 1 wherein the terminals are mutually engageable fluid ports.

9. Connector assembly according to claim 8, wherein the fluid ports are defined in a male terminal element and in a female terminal element respectively, one of said elements being attached to the plug and the other to the socket, and with a gasket seal being provided between said elements.

10. Connector assembly according to claim 1, wherein the second cover is retained in a seat defined between the plug member and the second support and the first cover is retained in a seat defined between the socket member and the first support, when the socket and plug members are engaged.

11. Connector assembly according to claim 1, further comprising guide means in fixed position relationship to the first and second supports, for guiding the first and second supports during mutual displacement.

12. Connector assembly according to claim 11, wherein the guide means comprises at least two grooves and a rib with one groove and rib being defined in the first support and with another groove and rib being defined in the second support.

13. A connector assembly for optical conductors, comprising:
   a—a support body and a handle;
   b—a socket member supported in said base;
   c—a plug member rigidly connected to said handle;
   d—said socket member and said plug member having a mutually engaged and a mutually disengaged position;
   e—said socket member having a first terminal housing chamber defined therein and a plurality of first optical terminals, a first lid pivoted thereto to form a closed and an open position respectively for said first terminal housing chamber, such that when in said closed position, said first lid closes said first terminal housing chamber, thereby providing a screen to protect said plurality of first optical terminals in said first terminal housing chamber from the ambient environment;

f—said plug member having a second terminal housing chamber defined therein and a plurality of second optical terminals and comprising a second lid pivoted thereto to form a closed and an open position respectively for said second terminal housing chamber such that when in said closed position, said second lid closes said second terminal housing chamber, thereby providing a screen to protect said second plurality of optical terminals in said second terminal housing chamber from the ambient environment;

g—said plug member further having a forward projection which fits snugly into said first terminal housing chamber of said socket member, when said plug member and socket member are in their mutually engaged position;

h—said support body and handle being displaceable towards and away from one another, to bring said socket and plug members to their engaged position whereby to connect said pluralities of first and second optical terminals, or to disengage them whereby to disconnect said pluralities of first and second optical terminals;

i—rib and groove guide means in fixed positioned relationship to said base and handle, for guiding said support body and handle during the mutual displacement thereof;

j—elastic means for urging said first and second lids to their respective closed position when said socket and plug members are not in the engaged position;

k—a shoulder defined in said support body for engaging said second lid to swing to the open position; and l—said handle having a projection extending forwardly beyond a front end of said plug member for engaging said first lid as said support body and handle are displaced toward one another and causing said first lid to swing to the open position.

14. A connector assembly for engaging and disengaging a plurality of terminals containing optical or electrical conductors or fluid line terminals respectively, said connector assembly comprising:

a—a first movable support body;

b—a socket member connected to said first movable support body, said socket member having a socket cavity and a plurality of first terminals, a first cover movably connected to said socket member to form a closed and an open position respectively for said socket cavity wherein when said first cover is moved into said closed position said socket cavity forms a first enclosure for said plurality of first terminals to prevent exposure to environmental pollutants;

c—a second movable support body;

d—a plug member connected to said second movable support body, said plug member having a plug cavity and a plurality of second terminals a second cover movably connected to said plug member to form a closed position and an open position respectively for said plug cavity, wherein when said second cover is moved into said closed position, said plug cavity forms a second enclosure for said plurality of second terminals to prevent exposure to environmental pollutants;

e—said first and said second support body being mutually displaceable relative to one another in opposite directions to engage and disengage the socket and plug members respectively so that when said plug and socket are in an engaged position said first and second plurality of terminals are engaged to one another and when said plug and socket are disengaged said plurality of first and second terminals are disengaged from one another;

f—elastic means connected to each of said first and second cover for urging the first and second cover to their respective closed positions when said socket and plug member are disengaged;

g—guide means for guiding said socket and plug members in their mutual displacements;

h—projection means extending from said first and second movable support body for concurrently urging said first and second cover into their respective open positions when said socket and plug members are moved into said engaged position; and said elastic means concurrently returning said first and second cover from the open position to the closed position when the socket and plug members are moved into said disengaged position.

* * * * *